United States Patent
Sornik et al.

(10) Patent No.: US 11,628,798 B2
(45) Date of Patent: Apr. 18, 2023

(54) PASSENGER RECEPTACLE FOR AN AMUSEMENT RIDE, METHOD FOR OPERATING SUCH A PASSENGER RECEPTACLE, AND AMUSEMENT RIDE HAVING SUCH A PASSENGER RECEPTACLE

(71) Applicant: MACK RIDES GMBH & CO. KG, Waldkirch (DE)

(72) Inventors: Frank Sornik, Waldkirch (DE); Markus Becherer, Elzach (DE); Stephan Schrade, Teningen (DE)

(73) Assignee: MACK RIDES GMBH & CO. KG, Waldkirch (DE)

(*) Notice: Subject to any disclaimer, the term of this patent is extended or adjusted under 35 U.S.C. 154(b) by 389 days.

(21) Appl. No.: 16/648,140

(22) PCT Filed: Jun. 29, 2018

(86) PCT No.: PCT/EP2018/067601
§ 371 (c)(1),
(2) Date: Mar. 17, 2020

(87) PCT Pub. No.: WO2019/057357
PCT Pub. Date: Mar. 28, 2019

(65) Prior Publication Data
US 2020/0216013 A1    Jul. 9, 2020

(30) Foreign Application Priority Data
Sep. 19, 2017    (DE) .......................... 102017121730.4

(51) Int. Cl.
*B60R 22/04*    (2006.01)
*A63G 7/00*    (2006.01)

(52) U.S. Cl.
CPC ................ *B60R 22/04* (2013.01); *A63G 7/00* (2013.01)

(58) Field of Classification Search
CPC . B60R 22/04; B60R 2021/0097; B60R 22/02; B60R 21/00; A63G 7/00
See application file for complete search history.

(56) References Cited

U.S. PATENT DOCUMENTS 5,265,823 A * 11/1993 Doty ....................... B60R 22/44
                                                           242/372
5,489,212 A      2/1996 Masao et al.
(Continued)

FOREIGN PATENT DOCUMENTS

DE       20314975 U1    2/2005
DE    102011120532 A1 * 6/2013 ............... B60N 2/06
(Continued)

OTHER PUBLICATIONS

Office Action dated Apr. 13, 2021, in parallel Japanese patent application 2020-537286, with Notification of Decision of Rejection and English translation.
(Continued)

*Primary Examiner* — Nasim N Nirjhar
(74) *Attorney, Agent, or Firm* — Nath, Goldberg & Meyer; Jerald L. Meyer; Morgan D. Rosenberg

(57) ABSTRACT

The invention relates to a passenger receptacle for an amusement ride (50), comprising a receiving portion (12) for receiving a passenger, a retaining device (20), which is adjustable between an open position, in which the access to the receiving portion (12) is possible for the passenger, and a closed position, in which the received passenger is held in the receiving portion (12), and a securing device (26), which interacts with the retaining device (20) in such a way that whenever the retaining device moves away, or wants to move away, from the
(Continued)

Figures 1A, 1B:
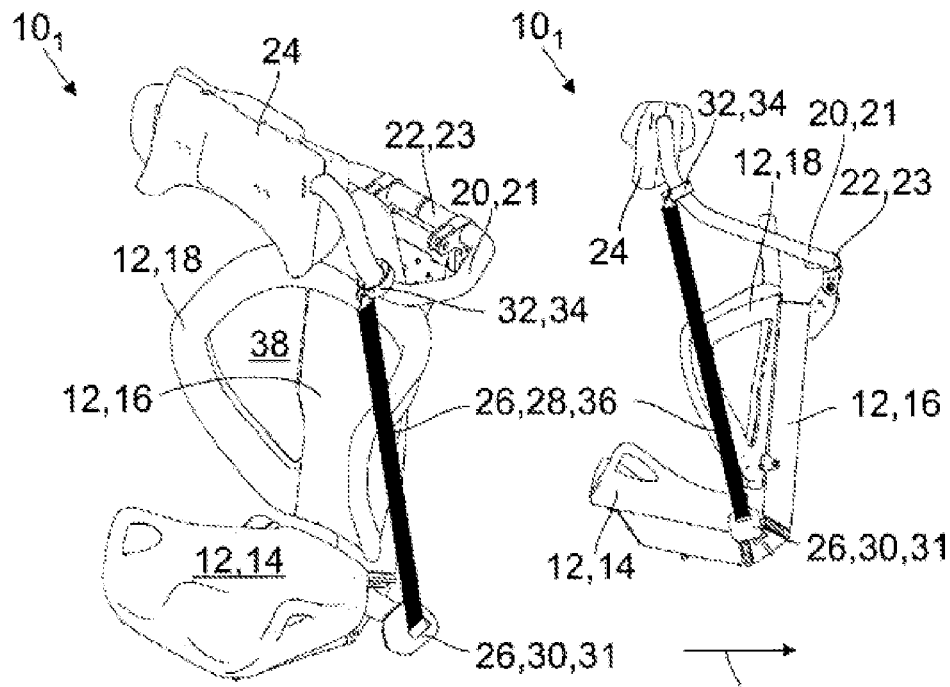

closed position by a selectable degree, a further movement of the retaining device away from the closed position is blocked. The invention further relates to a method for operating such a passenger receptacle (10) and to an amusement ride (50) having such a passenger receptacle (10).

18 Claims, 3 Drawing Sheets

(56) References Cited

U.S. PATENT DOCUMENTS

| | | | |
|---|---|---|---|
| 6,220,171 B1 * | 4/2001 | Hettema | B60R 22/3405 472/60 |
| 6,637,341 B2 | 10/2003 | Kroon et al. | |
| 7,837,566 B2 | 11/2010 | Smith | |
| 2003/0024428 A1 * | 2/2003 | Kroon | A63G 27/04 104/53 |
| 2008/0143158 A1 | 6/2008 | Roodenburg et al. | |
| 2010/0102604 A1 | 4/2010 | Barnes et al. | |
| 2012/0068521 A1 | 3/2012 | Roodenburg et al. | |

FOREIGN PATENT DOCUMENTS

| | | | | |
|---|---|---|---|---|
| EP | 1384003 | B1 | 1/2004 | |
| EP | 1394003 | A2 * | 3/2004 | ............ A63G 7/00 |
| EP | 1394003 | A2 | 3/2004 | |
| JP | 02063954 | A | 3/1990 | |
| JP | 2007525373 | A | 9/2007 | |
| JP | 6292768 | B2 | 3/2018 | |

OTHER PUBLICATIONS

Decision of Rejection dated Dec. 7, 2021, in Japanese patent application 2020-537286.
Office Action dated May 17, 2018, for corresponding German application No. 102017121730.4.
EP Office Action dated Nov. 28, 2022, in corresponding EP application No. 18 736 864.2.

* cited by examiner

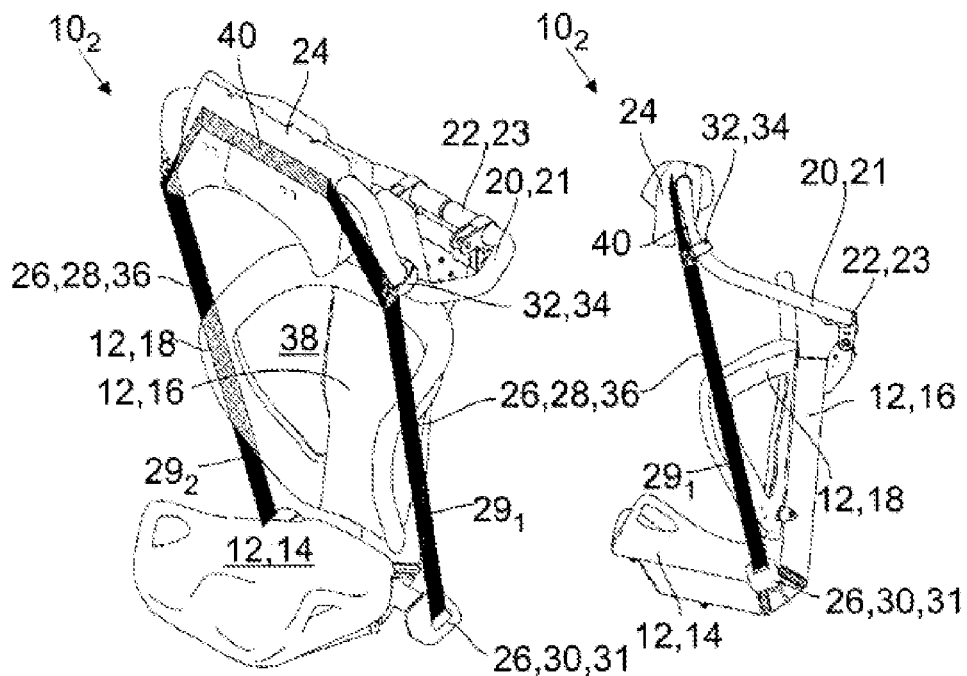
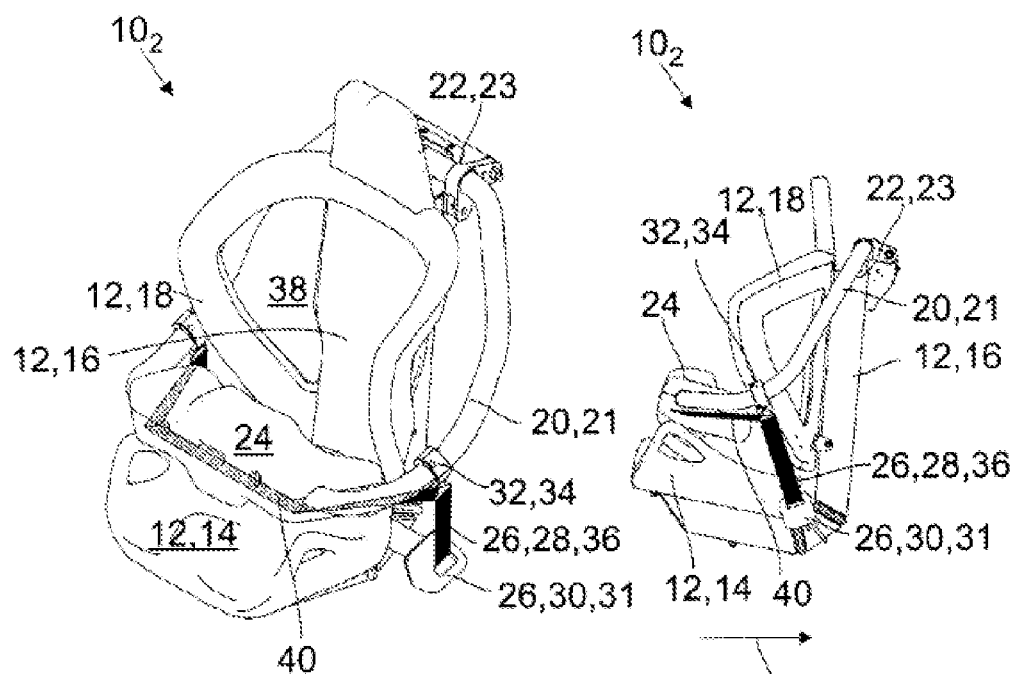

PASSENGER RECEPTACLE FOR AN AMUSEMENT RIDE, METHOD FOR OPERATING SUCH A PASSENGER RECEPTACLE, AND AMUSEMENT RIDE HAVING SUCH A PASSENGER RECEPTACLE

This is a National Phase Application filed under 35 U.S.C. 371 as a national stage of PCT/EP2018/067601, filed Jun. 29, 2018, an application claiming the benefit of German Application No. 102017121730.4, filed Sep. 19, 2017, the content of each of which is hereby incorporated by reference in its entirety.

The present invention relates to a passenger receptacle for an amusement ride, a method for operating such a passenger receptacle, and an amusement ride having such a passenger receptacle.

In order to operate amusement parks economically, the attractiveness of the amusement park plays a very important role. Thus, the goal is to implement as many surprising ride experiences for the passenger as possible. As relates to roller coasters, these ride experiences are implemented, inter alia, with loops, sharp curves, route sections with steep inclines, as well as with screw-shaped route sections.

These ride experiences then can only be implemented when the passengers can be safely held in the amusement ride. To this end, amusement rides have a number of vehicles with passenger receptacles, in which the passengers can sit, make adjustments, or lie back. Passengers are held in the passenger receptacles with the aid of retaining devices, which frequently comprise safety bars. To this end, the safety bars are adjusted from an open position, in which access to the passenger receptacle is possible for the passenger, to a closed position, in which the passenger in the passenger receptacle interacts with the retaining device such that the passenger cannot fall out of the passenger receptacle during the ride, even under high accelerations and loads. The safety bar can be adjusted between the open position and the closed position with the aid of an adjusting device. The adjusting device is typically operated by means of a hydraulic system. However, it is also conceivable to operate the adjusting device mechanically, electrically, or pneumatically. It is also possible, however, that the safety bar is adjusted between the open position and the closed position by the passengers themselves or by an amusement ride employee.

In addition, in many cases there is a locking unit, which can be used to lock the safety bar in the closed position. The locking unit may be designed as a mechanical lock, with which the safety bar can be locked in the closed position on the passenger receptacle or the vehicle. With more modern amusement rides, the locking unit may be designed as part of the hydraulic system and, to this end, designed to lock the safety bar in the open position as well in order to prevent unintentional movements.

In the event that the locking unit is locked in the closed position by means of a hydraulic system, it can no longer be guaranteed that the safety bar will remain locked in the closed position in the event of pressure loss in the hydraulic system. In this case, it may happen that the passenger in the passenger receptacle is no longer being sufficiently held, which must be avoided in all cases. The same thing applies accordingly in the event that the locking unit is not operated hydraulically but instead pneumatically, mechanically, or electrically.

The object of one embodiment of the present invention is to refine a passenger receptacle and an amusement ride of the aforementioned type such that the passengers are still being retained sufficiently in the passenger receptacle when the retaining device can no longer be maintained in the closed position. Furthermore, the object of one embodiment of the present invention is a method for operating a passenger receptacle such that the passengers are still being held sufficiently in the passenger receptacle when the retaining device can no longer be maintained in the closed position.

Said object is achieved with the features indicated in claims 1, 19, 20, and 25. Advantageous embodiments are the subject matter of the dependent claims.

One embodiment of the invention relates to a passenger receptacle for an amusement ride, comprising a receiving portion for receiving a passenger, a retaining device, which is adjustable between an open position, in which the access to the receiving portion is possible for the passenger, and a closed position, in which the received passenger is held in the receiving portion, a securing device, which interacts with the retaining device in such a way that whenever the retaining device moves away, or wants to move away, from the closed position, a further movement of the retaining device away from the closed position is blocked.

Once the passenger has been received in the receiving portion in the open position of the retaining device, the retaining device moves into the closed position. In addition, a locking unit may be provided, with which the retaining device can be locked in position, at least in the closed position. The securing device interacts with the retaining device in such a way that whenever the retaining device moves away, or wants to move away, from the closed position, a further movement of the retaining device away from the closed position is blocked.

The securing device blocks the movement of the retaining device out of the closed position in the direction of the open position as soon as said movement has exceeded a certain degree. In other words, the retaining device must have traveled a certain, selectable distance from the closed position in the direction of the open position so that the securing device blocks a further movement of the retaining device into the open position. This path is selected such that passengers are always still being sufficiently held in the passenger receptacle when the retaining device is in the position (blocking position) in which the securing device blocks the further movement. Thus, the blocking position is very close to the closed position.

However, the blocking position can also be selected in such a way that whenever the retaining device wants to move away from the closed position, the further movement away from the closed position is blocked. In this case, the degree by which the retaining device must move from the closed position in the direction of the open position is equal to zero. The blocking position in this case is the same as the closed position.

An essential aspect of the present invention is that the blocking depends on the path, wherein the present invention differs, for example, from a belt-based restraint system in a motor vehicle, which blocks dependent on force, i.e. in the event that the force acting on the belt exceeds a certain degree. The fact that the path may also have the length of "zero" does not contradict path-dependent blocking.

As previously mentioned, the passenger receptacle may have a locking unit, with which the retaining device can be locked, at least in the closed position. If the locking unit fails, the retaining device is moved out of the closed position in the direction of the open position so that the locking unit reaches the blocking position independently of the force acting on the retaining device. As mentioned, the locking unit may be actuated hydraulically. It may be that the hydraulic pressure drops relatively slowly such that the retaining device is also moved relatively slowly from the closed position into the open position. In this case, a force-dependent retaining system, as is known from a motor vehicle, would not block the movement of the retaining device and would thus be ineffective.

In order to implement path-dependent blocking, the securing device may have, for example, a perforated disc with a bow-shaped elongated hole, with which a bolt engages, said disc being coupled to the safety bar. Upon movement from the closed position in the direction of the open position, the perforated disc is rotated. When the blocking position is reached, the bolt strikes an end of the elongated hole and prevents the further movement of the safety bar.

In the event that the blocking should occur when the retaining device wants to move away from the closed position, the perforated disc does not have a bow-shaped elongated hole but instead a circular hole, with which the bolt engages precisely.

In order to enable access to the receiving portion when passengers are entering and exiting while the amusement ride is stopped, the bolt is moved from the elongated hole or the hole in such a way that the safety bar can be moved into the open position.

In the event that a locking unit is provided, a redundancy is obtained which ensures that the passenger will still be safely held in the passenger receptacle when the locking unit is no longer properly functioning. The reason for this in particular is that the securing device functions independently of the locking unit.

According to the provisions of a further embodiment, the amusement ride has a number of vehicles and a securing device comprises at least one tensile force transfer means, which is attached or can be attached with a first end to the retaining device and with a second end to the passenger receptacle or the vehicle and which, when the retaining device moves away, or wants to move away, from the closed position, blocks a further movement of the retaining device away from the closed position.

In this simplest case, the tensile force transfer means may be designed as a traction cable, which is attached, at its second end, to the passenger receptacle or to the vehicle and is connected with its first end, for example, to the safety bar of the retaining device when the safety bar is in the closed position. To this end, the traction cable has a carabiner or a hook on the first end. If the locking unit fails and the safety bar moves from the closed position into the open position, the traction cable is tensioned. In the blocking position, the traction cable will not allow any further movement in the direction of the open position and transfers the forces acting on the safety bar to the passenger receptacle. The passenger is consequently safely held in the passenger receptacle despite failure of the locking unit.

According to a further embodiment, the tensile force transfer means has a length-compensation means in order to follow the movement of the retaining device between the open position and the closed position. As previously mentioned, the tensile force transfer means may be designed as a traction cable. The traction cable, however, cannot change its length, which is why it must be separated from the retaining device when the retaining device is supposed to move into the open position. To this end, a corresponding work step is necessary, which must be implemented either by the passengers themselves or the amusement ride employees, and this is time-intensive and reduces the capacity of the amusement ride. In addition, errors can occur which negatively affect safety. If the tensile force transfer means is equipped with a length-compensation means, the tensile force transfer means is not to be separated from the retaining device, so that the disadvantages mentioned can be avoided. Length-compensation means may be implemented, for example, in that the tensile force transfer means is designed in the manner of a telescope and the length is adjustable.

In a further embodiment, the length-compensation means is designed as a lockable winding unit, onto which the tensile force transfer means can be wound and from which the tensile force transfer means can be unwound. The winding unit can be attached to the passenger receptacle, the vehicle, or the retaining device. It is possible to design the tensile force transfer means as a belt. According to the proposal, the rolling up and unrolling of the tensile force transfer means takes place between the closed position and the open position, due to a corresponding adjustment to the retaining device and particularly to the safety bar, such that the tensile force transfer means does not have to be additionally actuated to adjust the safety bar.

U.S. Pat. No. 7,837,566 B2 discloses a belt system for a passenger receptacle, in which the belt must be placed in a belt buckle once the passenger has gotten into position in the passenger receptacle. Accordingly, the belt must then again be removed from the belt buckle when the passenger wishes to exit the passenger receptacle. This can quickly lead to a delay in the operational procedure. In addition, operating errors cannot be excluded.

In contrast, if the tensile force transfer means, which is particularly designed as a belt, is attached on the first end to the retaining device and attached on the second end to the vehicle and/or to the passenger receptacle, it is no longer necessary to buckle the belt into the buckle and unbuckle it again. This enables unimpeded operation of the passenger receptacle and consequently of the amusement ride without the associated delays. Neither the passenger nor an amusement ride employee must actively carry out particular acts. The passenger also does not have to be touched by the employee. In addition, the capacity of the amusement ride is not reduced.

U.S. Pat. No. 6,637,341 B2 discloses a passenger receptacle, which is equipped with a belt system, which has two belts and one intermediate element. The belts can be wound onto a winding unit. This belt system is used to safely hold the passenger in the passenger receptacle during the ride and keep the passenger from hitting the safety bar with excessive force. This belt system is not capable of ensuring that the safety bar is held in the blocking position in the event of failure of the locking unit.

According to a further embodiment, the tensile force transfer means is attached on the first end to the retaining device with a connection means. The connection means enables the subsequent attachment to existing retaining devices in a manner such that existing amusement rides can be retrofitted with the securing device. In addition, the retaining device and particularly the safety bar, which is typically constructed from pipes, do not have to be changed in design in order to enable attachment of the tensile force transfer means. In particular, this keeps the safety bar from becoming weak and thus breaking under lower loads than is desired. Depending on the application case, the tensile force transfer means can be attached rotatably, flexibly, or rigidly to the retaining device.

According to the provisions of a further embodiment, the tensile force transfer means is rotatably attached to the retaining device with a clamping means. The rotatable position of the tensile force transfer means on the safety bar is then particularly important when the tensile force transfer means is designed as a belt. This hereby ensures that the tensile force transfer means can be unwound from the winding unit extensively without torsion during the adjustment of the safety bar from the closed position into the open position. The same thing applies in the reverse case when the tensile force transfer means is to be wound up onto the winding unit during the adjustment of the safety bar from the open position into the closed position. Otherwise, with a non-rotatable attachment to the safety bar, the belt would be subject to bending, whereby the belt could become damaged and break.

The clamping means enable the subsequent attachment of the tensile force transfer means to the retaining device in a manner such that an existing passenger receptacle can be retrofitted with the proposed securing device.

It is possible to detachably attach the tensile force transfer means and/or the winding unit to the passenger receptacle or to the securing device. To this end, the clamping means may be designed, for example, as a pipe clamp. In many cases, the safety bar has a substantially circular cross-section in a manner such that the use of a pipe clamp or a pipe clip means that no design changes are needed to the safety bar. In particular, no hole which could lead to weakening of the safety bar is necessary. They can easily be replaced in the event of damage, exceeding of a certain operating period, or in the course of overhauling the tensile force transfer means and/or the winding unit.

According to a further embodiment, the securing device is arranged outside of the receiving portion, at least in the open position of the retaining device. This ensures easy access to the receiving portion for the passenger in the open position in a manner such that the passenger can enter and exit easily and quickly. Because the time needed to enter and exit can hereby be reduced, the capacity of the amusement ride is increased.

In a refined embodiment, the passenger receptacle may have at least one side rest, and the securing device may be arranged outside of the receiving portion limited by the side rest. Passenger receptacles are typically equipped with at least one side rest in order to provide the passenger with sufficient side support. The side rest may be part of a backrest contour and thus not be designed as a separate component. In this embodiment, it is ensured that the passenger can easily enter the receiving portion and then exit it without the tensile force transfer means being damaged in the process.

In a further embodiment, the winding unit and the connection means may be arranged in the passenger receptacle such that the side rest is aligned with the tensile force transfer means transversely with respect to the direction of entry, or protrudes beyond the tensile force transfer means counter to the direction of entry. The direction of entry describes the direction into which the passenger must move in order to enter the passenger receptacle. In this embodiment, the tensile force transfer means is prevented from unintentionally still reaching the receiving portion. The side rests in this case are used as a type of stop for the tensile force transfer means.

A further embodiment is characterized in that the amusement ride has a number of vehicles and the securing device comprises at least one tensile force transfer means, which is attacked with a first end and with a second end to the passenger receptacle or attached to the vehicle, and is operatively connected to the retaining device between the first end and the second end, and which blocks a further movement of the retaining device away from the closed position when the retaining device moves, or wants to move, away from the closed position.

The tensile force transfer means can be operatively connected to the retaining device, for example, by means of a pipe arranged on the retaining device or by means of a number of eyelets, through which the tensile force transfer means are implemented. In this case, a movement of the tensile force transfer means may be enabled along their longitudinal axis as relates to the retaining device.

When the retaining device is in the closed position, the passenger is surrounded by the tensile force transfer means, similarly to a lap belt in a vehicle or airplane. In the event that, for example, the safety bar should break during operation of the amusement ride, the tensile force transfer means ensures that the passenger cannot fall out of the passenger receptacle. In this case, the safety of the passenger is increased in this respect. Moreover, the broken-off part of the safety bar is retained on the passenger receptacle by the tensile force transfer means in a manner such that the broken-off part does not fly around uncontrollably and possibly injure other passengers or people in the environment of the amusement ride.

In a further embodiment, the tensile force transfer means has a length-compensation means in order to follow the movement of the retaining device between the open position and the closed position. As previously mentioned, the tensile force transfer means may be designed as a traction cable. The traction cable, however, cannot change its length, which is why it must be separated from the retaining device when the retaining device is supposed to move into the open position. To this end, a corresponding work step is necessary, which must be implemented either by the passengers themselves or the amusement ride employees, and this is time-intensive and reduces the capacity of the amusement ride. In addition, errors can occur which negatively affect safety. If the tensile force transfer means is equipped with a length-compensation means, the tensile force transfer means is not to be separated from the retaining device, so that the disadvantages mentioned can be avoided. Length-compensation means may be implemented, for example, in that the tensile force transfer means is designed in the manner of a telescope and the length is adjustable.

According to a further embodiment, the tensile force transfer means comprises two tensile force transfer portions, each of which is attached on the first end to the retaining device with a connection means and can be wound onto and unwound from a lockable winding unit.

From a technical perspective, it is sufficient in most cases to provide only one tensile force transfer means for blocking the safety bar when the blocking position is reached, which is arranged, for example, on a side of the passenger receptacle. The provision of a second tensile force transfer means ensures a redundancy in the event that at least one of the tensile force transfer means should fail. Some amusement rides have safety bars with only one pipe bracket. If the safety bracket breaks, the passenger can always still be secured with the part of the safety bracket arranged between the two connection means.

The winding unit can be attached to the passenger receptacle, the vehicle, or to the retaining device. According to the proposal, the rolling up and unrolling of the tensile force transfer means takes place between the closed position and the open position, due to a corresponding adjustment to the retaining device and particularly to the safety bar, such that the tensile force transfer means does not have to be additionally actuated to adjust the safety bar. This enables unimpeded operation of the passenger receptacle and consequently of the amusement ride without the associated delays. Neither the passenger nor an amusement ride employee must actively carry out particular acts. The passenger also does not have to be touched by the employee. In addition, the capacity of the amusement ride is not reduced.

According to the provisions of a further embodiment, particularly a one-piece restraining belt extends between the two tensile force transfer means. In this embodiment, a restraining belt, which functions similarly to a lap belt in a vehicle or an airplane, is arranged between the two tensile force transfer means, each of which is arranged on opposite sides of the passenger receptacle. In the event that the safety bar should break during operation of the amusement ride, the restraining belt ensures that the passenger cannot fall out of the passenger receptacle. In this case, the safety of the passenger is increased in this respect. Moreover, the broken-off part of the safety bar is retained on the passenger receptacle by the tensile force transfer means in a manner such that the broken-off part does not fly around uncontrollably and possibly injure other passengers or people in the environment of the amusement ride.

In this embodiment, the restraining belt establishes a connection between the two tensile force transfer means. Consequently, the two tensile force transfer means and the restraining belt can be combined into one unit. The connection means can be designed such that they enable a movement of said unit. Consequently, only one winding unit, onto which rolling can occur, is sufficient. The connection means must then be designed such that the tensile force transfer means can move along the longitudinal axis as relates to the retaining device.

A further embodiment is characterized in that the restraining belt is attached to the two connection means. It is possible to use the connection means, which connect the tensile force transfer means to the safety bar, for the attachment of the restraining belt as well. The increased technical complexity for providing the restraining belt is hereby kept low. If the safety bar should break and the connection means, which is designed, for example, as a pipe clamp, should slip off of the bar, sufficient securing of the passenger is still ensured.

In a further embodiment, the securing device may comprise a drive device which can be actuated, with which the securing device can be driven. In this embodiment, the safety bar can be closed with the aid of the securing device. If there is a hydraulic system, it is relieved, because the number of circuits is reduced. The corresponding switching valves are actuated less frequently. In addition, the drive device can relieve the tensile force transfer means after closing of the safety bar in a manner such that the safety bar is only retained by the locking unit and by the hydraulic system during operation. The tensile force transfer means is hereby operated at least in a manner so as to reduce load, whereby wear can be minimized.

In a further embodiment, the drive device comprises an electric motor. Particularly in the event that the locking unit is actuated by means of a hydraulic system, there are two systems independent from one another. The probability of simultaneous failure of two systems is significantly less than the failure of one system. An electric motor can be activated more precisely than the locking unit actuated by the hydraulic system. With use of the tensile force transfer means between the open position and the closed position, the safety bars can be tightened into the closed position at a different torque. When the safety bar is not far from the open position, the tensile force transfer means can be tightened at a lower torque. If the safety bar should come into contact with the passenger, for example, because the passenger is not yet completely seated, the contact will not cause injuries to the passenger. In addition, the electric motor can quickly interrupt the tightening of the tensile force transfer means in this case, which is difficult to implement with a hydraulic actuation of the safety bar. When the safety bar is close to the closed position, the torque can be increased slowly in a manner such that the safety bar is pressed gently onto the passenger.

In a further embodiment, the securing device is attached to the passenger receptacle or to the retaining device by means of a relief element. The pretension element absorbs certain tractive forces acting on the tensile force transfer means during operation in a manner such that the tensile force transfer means is operated at reduced load and is thus protected.

One variant of the invention relates to a passenger receptacle for an amusement ride, comprising a receiving portion for receiving a passenger, a retaining device, which is adjustable between an open position, in which the access to the receiving portion is possible for the passenger, and a closed position, in which the received passenger is held in the receiving portion, and a securing device, which comprises an actuatable drive device, with which the securing device can be driven, and which interacts with the retaining device in such a way that the retaining device can be moved at least away from the open position into the closed position.

This variant is particularly suitable for amusement rides in which the retaining device cannot be moved between the open position and the closed position with an adjusting device. In this variant, the securing device can be used as a replacement for an adjusting device. As previously mentioned, the securing device can be designed such that it is mounted on the passenger receptacle subsequently. Consequently, this variant offers the possibility of modernizing older amusement rides and operating them in a more comfortable and effective manner. In the event that the safety level of a particular amusement ride is considered to be sufficient, the securing device can be used as a replacement for an adjusting device without the previously mentioned safety functions being used. However, it is also possible to operate the securing device with the safety functions mentioned and as a replacement for an adjusting device.

One design of the invention relates to a method for operating a passenger receptacle according to one of the previously described embodiments, having the following steps:

moving the retaining device into the closed position, and, in the event that the retaining device moves, or wants to move, away from the closed position by a selectable degree, blocking of a further movement of the retaining device away from the closed position by means of the securing device.

The technical effects and advantages that have been mentioned with this method correspond to those which have been described for the related embodiments of the passenger receptacle. In summary, it should be noted that a path-dependent securing of the retaining device is obtained which prevents the retaining device from moving so far away from the closed position in the direction of the open position during operation of the passenger receptacle that the passengers are no longer sufficiently secured in the passenger receptacle. As soon as the retaining device moves from the closed position and reaches the blocking position, any further movement away from the closed position is prevented.

In a further embodiment of the method, the securing device comprises at least one tensile force transfer means, which is operated at least at reduced load, as long as a further movement of the retaining device away from the closed position is not blocked by means of the tensile force transfer means. During an at least load-reduced operation, it should be understood that the forces acting on the retaining device during operation of the amusement ride are absorbed primarily by the locking unit and thus only introduced into the tensile force transfer means to a very limited degree. The at least load-reduced operation ensures that the tensile force transfer means is protected and not unnecessarily loaded.

One design of the invention relates to a method for operating a securing device of a vehicle seat according to one of the previous embodiments, wherein the securing device comprises an actuatable drive device, characterized by the following step:
 adjusting the retaining device from the open position into the closed position by means of the securing device by actuating the drive device.

In this design, particularly the safety bar is tightened into the closed position from the open position using the tensile force transfer means. In this design, the securing device also takes on the function of an adjusting device, which can thus be omitted, which simplifies configuration of the related amusement ride.

In a further design, in which the drive unit is designed as an electric motor, which is configured to determine the position of the safety bar between the open position and the closed position, the tensile force transfer means can be wound onto and off of a lockable winding unit, and the winding unit can be driven by means of the electric motor, the method comprises the following step:
 adjusting of the safety bar from the open position into the closed position by means of the winding unit at a torque which is changed by the electric motor depending on the position of the retaining device.

Configuration of electric motors in a manner such that they can detect the position particularly of the safety bar between the open position and the closed position can be implemented, for example, by means of a rotary encoder. Consequently, there is information regarding the current position of the safety bar between the open position and the closed position. The torque at which the safety bar is tightened using the tensile force transfer means can be varied depending on position. If the bar is moving from the open position in the direction of the closed position, it is possible that a particular passenger is not yet completely seated in the receiving portion and collides with the safety bar. In order to keep the resulting injuries to a minimum, the safety bar is initially operated at a comparatively low torque when exiting the closed position. Once the safety bar has almost reached the closed position, this indicates that the passenger is sitting correctly in the passenger receptacle. The torque can then be increased in order to press the safety bar gently onto the body of the passenger. Such a position-dependent change in the torque ensures a safer and pleasant closing process of the safety bar, which would only be implementable with a hydraulic actuation with extensive complexity.

One implementation of the invention relates to a method with the following steps:
 actuating the drive device of the securing device, and moving the retaining device from the open position into the closed position by means of the securing device.

This variant is particularly suitable for amusement rides in which the retaining device cannot be moved between the open position and the closed position with an adjusting device. In this variant, the securing device can be used as a replacement for an adjusting device. As previously mentioned, the securing device can be designed such that it is mounted on the passenger receptacle subsequently. Consequently, this variant offers the possibility of modernizing older amusement rides and operating them in a more comfortable and effective manner. In the event that the safety level of a particular amusement ride is considered to be sufficient, the securing device can be used as a replacement for an adjusting device without the previously mentioned safety functions being used. However, it is also possible to operate the securing device with the safety functions mentioned and as a replacement for an adjusting device.

One design of the invention relates to an amusement ride with a passenger receptacle according to any of the previous embodiments or variants, wherein the passenger receptacle has a securing device, which can be operated with a method according to any of the previously mentioned designs or embodiments.

The technical effects and advantages that can be achieved with the amusement ride according to the proposal correspond to those that have been mentioned for the present passenger receptacle or the present method. In summary, it should be noted that a passenger can also be safely secured in the passenger receptacle with the securing device according to the proposal when the locking unit is no longer functioning properly. In many cases, the locking unit is operated by means of a hydraulic system, which ensures that particularly the safety bar is fixed both in the open position and in the closed position in a manner such that it can no longer move. In the event that the hydraulic system is no longer functioning properly, one possibility according to the proposal is obtained to keep the safety bar in the blocking position once it has reached the blocking position. This makes operation of the amusement ride safer.

Figures 2A, 2B:
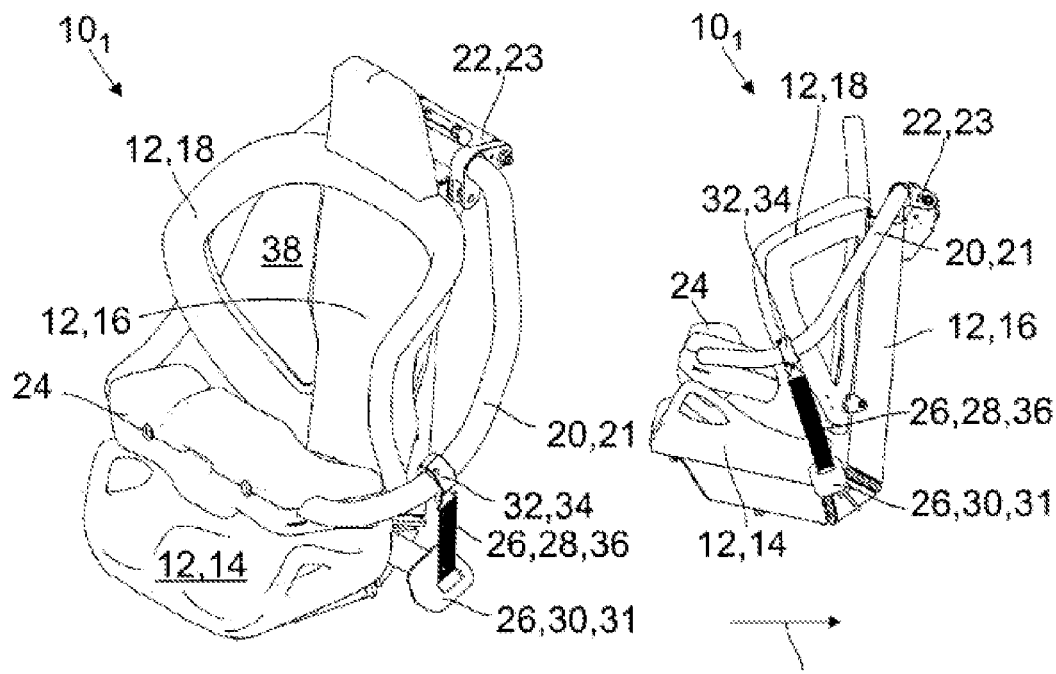
Figure 5:
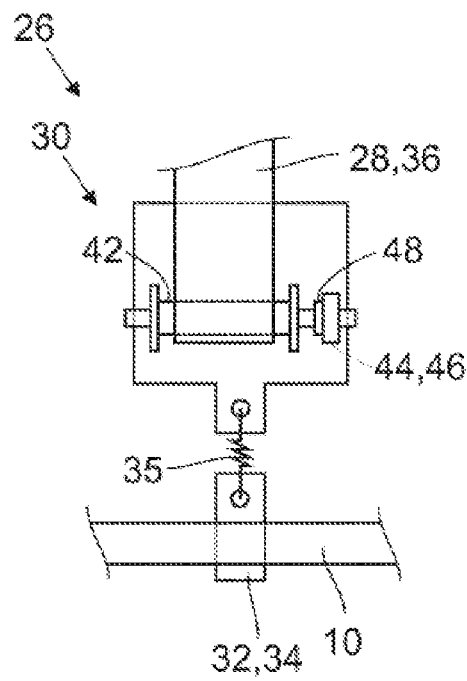

Exemplary embodiments of the invention are explained in greater detail in the following with reference to the enclosed drawings. The following is shown:

FIG. 1a) a first exemplary embodiment of a passenger receptacle according to the invention in the open position, by means of a perspective view;

FIG. 1b) the first exemplary embodiment of the passenger receptacle according to the invention, which is shown in FIG. 1a), in the open position, by means of a side view;

FIG. 2a) the first exemplary embodiment of the passenger receptacle according to the invention, which is shown in FIG. 1a), in the closed position, by means of a perspective view;

FIG. 2b) the first exemplary embodiment of the passenger receptacle according to the invention, which is shown in FIG. 1a), in the closed position, by means of a side view;

FIG. 3a) a second exemplary embodiment of the passenger receptacle according to the invention in the open position, by means of a perspective view;

FIG. 3b) the second exemplary embodiment of the passenger receptacle according to the invention, which is shown in FIG. 3a), in the open position, by means of a side view;

FIG. 4a) the second exemplary embodiment of the passenger receptacle according to the invention, which is shown in FIG. 3a), in the closed position, by means of a perspective view;

FIG. 4b) the second exemplary embodiment of the passenger receptacle according to the invention, which is shown in FIG. 3a), in the closed position, by means of a side view;

FIG. 5 a principal view of a winding unit according to the invention; and

Figure 6:
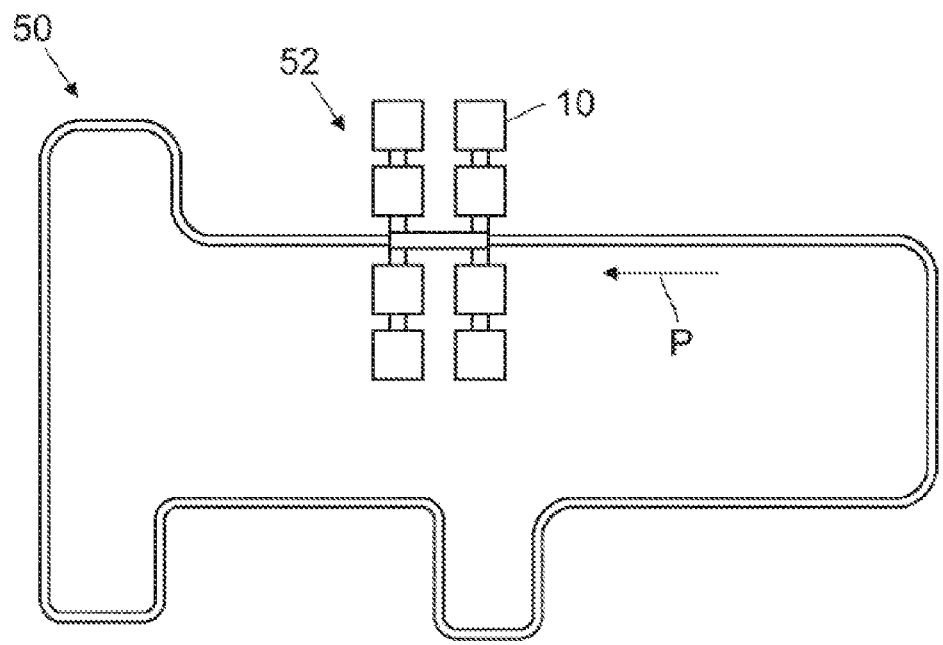

FIG. 6 a principal view of an amusement ride, which has a number of passenger receptacles according to the invention.

FIGS. 1 and 2 show a first exemplary embodiment of the passenger receptacle $10_1$ according to the invention in a different manner, in different positions. The passenger receptacle $10_1$ is part of a vehicle 52, which is shown in FIG. 6.

The passenger receptacle $10_1$ has a receiving portion 12, which is shown as a passenger seat in the exemplary embodiment shown, comprising a seat surface 14, a backrest 16, and two side rests 18. In addition, the passenger receptacle $10_1$ has a retaining device 20, which comprises a safety bar 21, which is rotatably mounted on the passenger receptacle $10_1$ and which can be adjusted between an open position and a closed position by means of an adjusting device 22. In the exemplary embodiment shown, the adjusting device 22 is configured such that it can lock the safety bar 21 in the open position and in the closed position. In this respect, the adjusting device 22 also serves as a locking unit 23. To this end, the locking unit 23 is connected, for example, to a hydraulic system, which is not shown.

In the open position, which is shown in FIGS. 1a) and 1b), the receiving portion 12 is accessible for the passengers such that the passenger can be seated in the receiving portion 12 and then can exit it.

The safety bar 21 has a thigh pad 24, which, in the closed position, is placed against the thigh of the passenger, not shown, seated in the receiving portion 12, as can be seen from FIGS. 2a) and 2b).

Moreover, the passenger receptacle $10_1$ according to the invention has a securing device 26, which comprises a tensile force transfer means 28 and a length-compensation means 31. The length-compensation means 31 in the present exemplary embodiment is formed as a lockable winding unit 30. Using a connection means 32, which is designed as a clamping means 34, for example a pipe clamp, in the first exemplary embodiment of the passenger receptacle $10_1$ shown in FIGS. 1 and 2, the tensile force transfer means 28 is rotatably attached to the safety bar 21 and designed as a belt 36. The winding unit 30 is attached to the passenger receptacle $10_1$ in the area of the seat surface 14; however, it can also be attached to the vehicle 52, for example to the floor panel. In a manner similar to a seatbelt in a vehicle, the belt 36 can be wound onto and unwound from the winding unit 30. In particular in FIG. 1a), it can be seen that the belt 36 extends outside of an intermediate space 38 of the passenger receptacle $10_1$ limited by the two side rests 18. Moreover, the two side rests 18 protrude over the belt 36 in the direction counter to entry, which is indicated by the arrow P shown in FIG. 1b). In the unloaded state, the belt 36 can also be easily placed in the intermediate space 38 limited by the two side rests 18.

The passenger receptacle $10_1$ is operated in the following manner: Passengers can enter the passenger receptacles 10 when the safety bar 21 is in the open position. As soon as a passenger has taken a seat in the receiving portion 12, the safety bar 21 is adjusted from the open position to the closed position with the aid of the locking unit 23. As previously mentioned, the locking unit 23 is connected to a hydraulic system, which is not shown, which ensures that the safety bar 21 is fixed in the open position and in the closed position. During the adjustment of the safety bar 21 from the open position into the closed position, the belt 36 is wound onto the winding unit 38. In the event that the hydraulic system is not functioning properly and the safety bar 21 can no longer be fixed in the closed position and the safety bar 21 moves from the closed position into the direction of the open position, the securing device 26 ensures that the safety bar 21 can no longer move further in the direction of the open position once reaching a blocking position. As previously mentioned, the winding unit 30 is lockable. As soon as the belt 36 has been pulled from the closed position due to movement of the safety bar 21 and is unwound from the winding unit 30, the winding unit 30 blocks the further unrolling of the belt 36 as soon as the safety bar 21 has reached the blocking position. The blocking position is selected such that it is very close to the closed position or corresponds thereto. As a result of this, the passenger is also securely held in the receiving portion 12 if the hydraulic system is no longer functioning properly.

FIGS. 3 and 4 show a second exemplary embodiment of the passenger receptacle $10_2$ according to the invention. The basic configuration of the passenger receptacle $10_2$ according to the second exemplary embodiment extensively corresponds to that of the first exemplary embodiment. However, the securing device 26 in the second exemplary embodiment comprises two tensile force transfer portions $29_1$, $29_2$, which are, in turn, designed as belts 36, and two winding units 30, which are each arranged on a side of the passenger receptacle $10_2$. In turn, the belts 36 are each rotatably attached to the safety bar 21 with a clamping means 34, for example a pipe clamp. Moreover, a restraining belt 40, which extends within the thigh pad 24, is provided between the two clamping means 34.

The passenger receptacle $10_2$ is operated in the manner described for the first exemplary embodiment. In contrast with the first exemplary embodiment, in the second exemplary embodiment, not just the safety bar 21 is held in the closed position when the hydraulic system is no longer functioning properly but the passenger is surrounded by the two belts 36 and the restraining belt 40, similar to a lap belt of a vehicle, when the safety bar 21 is placed in the closed position. This means that in the event that the safety bar 21 should break during operation, the passenger continues to be held in the receiving portion 12 with the two belts 36 and the restraining belt 40. In addition, the broken-off part of the safety bar 21 is retained on the passenger receptacle $10_2$.

In the exemplary embodiment shown in FIGS. 3 and 4, the two tensile force transfer portions $29_1$, $29_2$ are each firmly connected, on their first end, to the clamping means 34. The restraining belt 40 is also firmly connected to the clamping means 34. During adjustment of the retaining device 20, the two tensile force transfer portions $29_1$, $29_2$ are each wound onto and off of a length-compensation means 31 designed as the winding units 30. In doing so, the restraining belt 40 is not moved relative to the retaining device.

However, it is also possible to combine the two tensile force transfer portions $29_1$, $29_2$ and the restraining belt 40 into one unit. In addition, the clamping means may be designed as a type of deflection portion, which enables a movement of this unit along its longitudinal axis. In this case, it is sufficient to provide just one length-compensation means 31 and to firmly connect this unit to the vehicle 52 or the passenger receptacle 10 on the other side.

FIG. 5 shows an exemplary embodiment of a winding unit 30 by means of a principal view. It can be seen that the winding unit 30 is detachably attached to a support of the passenger receptacle 10, which is only roughly shown, by means of a clamping means 34. Consequently, it is easily possible to detach the winding unit 30 from the passenger receptacle 10 and replace it with a new one, provided this should be necessary. Moreover, the winding unit 30 is attached to the passenger receptacle 10 by means of a relief element 35, for example with a spring; however, it can also be attached to the vehicle 52. As mentioned, the safety bar 21 is held in the closed position by the locking unit 23. However, the safety bar 21 can move a bit during operation without this representing a risk to passengers. A certain amount of movement may even be desirable in order to achieve a damping effect. With such movements, the belt 36 is tensioned and relieved unnecessarily. With the relief element 35, a part of the tractive force acting on the belt 36 during operation is absorbed such that the belt 36 can be operated at least at reduced load. This prevents the belt 36 from being loaded unnecessarily and having to be replaced after a comparatively brief period of operation. Alternatively, the belt 36 and/or the restraining belt 40 may have the relief element 35. It is also conceivable to design the entire belt 36 or the entire restraining belt 40 elastically to a certain limit.

Furthermore, it can be seen that the winding unit 30 has a rotatably mounted cylinder 42, onto which the belt 36 can be wound. Furthermore, it can be seen that the cylinder 42 can be rotated by means of a drive device 44. The drive device 44 in this case is designed as an electric motor 46. The electric motor 46 interacts with a position-detection device 48, which can be designed, for example, as a rotary encoder. The position of the safety bar 21 between the open position and the rotational position can be determined with the aid of the position-detection device 48.

The following functions can hereby be implemented: The safety bar 21 can be moved from the open position into the closed position by rolling the belt 36 onto the cylinder 42, said rolling being initiated by the electric motor 46. The hydraulic system is hereby relieved. Moreover, the electric motor 46 can vary the torque it provides during roll-up of the belt 36 as a function of the position of the safety bar 21. Thus, the safety bar 21 can initially be moved from the open position in the direction of the closed position at a comparatively low torque, and then the safety bar 21 can be tightened at a higher torque shortly before reaching the closed position. For example, the torque can only be increased when the thigh pad 24 is resting against the thigh of the passenger.

Moreover, the electric motor 46 can again loosen the belt 36 when the safety bar 21 has been fixed in the closed position by the locking unit 23. The belt 36 is hereby operated in a load-reduced manner. As previously mentioned, the securing device 26 in the second exemplary embodiment has a restraining belt 40. This belt can be tensioned with the aid of the electric motor 46.

The winding unit 30 can also be mechanically locked, for example by means of a pawl or a perforated disc, in a manner such that power to the electric motor 46 can be switched off after successful locking. To ensure that the winding unit 30 can be mechanically locked, the cylinder 42 must particularly be placed in a certain position. Using the position-detection device 48, the electric motor 46 can place the winding unit 30 such that locking can be carried out.

As previously mentioned, the winding unit 30 can be designed such that the belt 36 provides blocking when the safety bar 21 is being moved out of the closed position and the blocking position is reached. To this end, the aforementioned perforated disc may have a curved elongated hole, into which a bolt is placed. When the safety bar 21 moves from the closed position in the direction of the open position, the perforated disc also rotates. The blocking position is then reached when the bolt stops at an end of the elongated hole. A further movement of the safety bar 21 in the direction of the open position is then excluded.

FIG. 6 shows an amusement ride 50 by means of a principal top view, which has a number of passenger receptacles 10 according to the invention. The passenger receptacles 10 can essentially be arranged as desired. In the example shown, the amusement ride 50 has a vehicle 52, in which four of the passenger receptacles 10 according to the invention are arranged next to one another and form a row. The vehicle shown has a total of two rows and thus a total of eight of the passenger receptacles 10 according to the invention.

LIST OF REFERENCE NUMERALS

10, $10_1$, $10_2$ Passenger receptacle
12 Receiving portion
14 Seat surface
16 Backrest
18 Side rest
20 Retaining device
21 Safety bar
22 Adjusting device
23 Locking unit
24 Thigh pad
26 Securing device
28 Tensile force transfer means
29, $29_1$, $29_2$ Tensile force transfer portion
30 Winding unit
31 Length-compensation means
32 Connection means
34 Clamping means
35 Relief means
36 Belt
38 Intermediate space
40 Restraining belt
42 Cylinder
44 Drive device
46 Electric motor
48 Position-detection device
50 Amusement ride
52 Vehicle
P Arrow

The invention claimed is:

1. A passenger receptacle for an amusement ride (50), comprising:
a receiving portion (12) for receiving a passenger;
a retaining device (20), which is adjustable between an open position, in which access to the receiving portion (12) is possible for the passenger, and a closed position, in which the received passenger is held in the receiving portion (12), wherein the open position comprises a raised position of the retaining device (20) relative to the receiving portion (12), and the closed position comprises a lowered position of the retaining device (20) relative to the receiving portion (12); and
a securing device (26), which interacts with the retaining device (20) in such a way that whenever the retaining device (20) moves away or wants to move away from the closed position by a selectable degree, a further movement of the retaining device (20) away from the closed position is blocked,
wherein the securing device (26) comprises at least one tensile force transfer means (28) having opposed first and second ends, the first end of the at least one tensile force transfer means (28) being attached to the retaining device (20), the at least one tensile force transfer means (28) applying a downward tensile force to the retaining device (20) to resist upward movement thereof from the closed position to the open position, wherein the at least one tensile force transfer means (28) can be wound onto and unwound from a lockable winding unit (30), wherein the securing device (26) comprises an actuatable drive device (44), wherein actuation of the actuatable drive device (44) drives the securing device (26) to adjust the retaining device (20) from the open position into the closed position, and wherein the actuatable drive device (44) comprises an electric motor (46), the electric motor (46) being configured to determine the position of the retaining device (20) between the open position and the closed position, such that adjusting the retaining device (20) from the open position into the closed position is further performed using the lockable winding unit (30) by a torque which is changed by the electric motor (46) according to the position of the retaining device (20), the lockable winding unit (30) being driven by the electric motor (46).

2. The passenger receptacle according to claim 1,
wherein the amusement ride has a number of vehicles (52), and
wherein the second end of the at least one tensile force transfer means (28) is attached to the passenger receptacle (10) or to a corresponding one of the vehicles (52).

3. The passenger receptacle according to claim 1, characterized in that the tensile force transfer means (28) has a length-compensation means (31) in order to follow the movement of the retaining device (20) between the open position and the closed position.

4. The passenger receptacle according to claim 3, characterized in that the length-compensation means (31) comprises the lockable winding unit (30).

5. The passenger receptacle according to claim 1, characterized in that the tensile force transfer means (28) is attached at the first end to the retaining device (20) by a connection means (32).

6. The passenger receptacle according to claim 5, characterized in that the tensile force transfer means (28) is attached to the retaining device (20) by means of a clamping means (34).

7. The passenger receptacle according to claim 4, characterized in that the tensile force transfer means (28) and/or the winding unit (30) is detachably attached to the passenger receptacle (10) or to the securing device (26).

8. The passenger receptacle according to claim 1, characterized in that the securing device (26) is arranged outside of receiving portion (12) at least in the open position of the retaining device (20).

9. The passenger receptacle according to claim 8, characterized in that the receiving portion (12) has at least one side rest (18) and the securing device (26) is arranged outside of the receiving portion (12) limited by the side rest (18).

10. The passenger receptacle according to claim 9, characterized in that, in the open position of the retaining device (20), the side rest (18) is aligned with the tensile force transfer means (28) transverse to the direction of entry (P) or protrudes beyond the tensile force transfer means (28) counter to the direction of entry (P).

11. The passenger receptacle according to claim 1, characterized in that the tensile force transfer means (28) comprises two tensile force transfer portions ($29_1$, $29_2$), each of which is attached at the first end thereof to the retaining device (20) by a connection means (32) and which can be wound onto and unwound from the lockable winding unit (30).

12. The passenger receptacle according to claim 11, characterized in that a particularly one-piece restraining belt (40) extends between the two tensile force transfer portions ($29_1$, $29_2$).

13. The passenger receptacle according to claim 12, characterized in that the restraining belt (40) is attached to the two connection means (32).

14. The passenger receptacle according claim 2, characterized in that the securing device (26) is attached to the passenger receptacle (10) or to the retaining device (20) by means of a relief element (35).

15. A passenger receptacle for an amusement ride (50), comprising:
a receiving portion (12) for receiving a passenger;
a retaining device (20), which is adjustable between an open position, in which access to the receiving portion (12) is possible for the passenger, and a closed position, in which the received passenger is held in the receiving portion (12), wherein the open position comprises a raised position of the retaining device (20) relative to the receiving portion (12), and the closed position comprises a lowered position of the retaining device (20) relative to the receiving portion (12); and
a securing device (26), which comprises an actuatable drive device (44), by means of which the securing device (26) can be driven, and which interacts with the retaining device (20) in such a way that the retaining device (20) can be moved at least from the open position into the closed position, adjustment of the retaining device (20) from the open position into the closed position being performed by means of the securing device (26) by actuating the actuatable drive device (44), and whenever the retaining device (20) moves away or wants to move away from the closed position by a selectable degree, a further movement of the retaining device (20) away from the closed position is blocked,
wherein the securing device (26) further comprises at least one tensile force transfer means (28) having opposed first and second ends, the first end of the at least one tensile force transfer means (28) being attached to the retaining device (20), the at least one tensile force transfer means (28) applying a downward tensile force to the retaining device (20) to resist upward movement thereof from the closed position to the open position,
wherein the at least one tensile force transfer means (28) can be wound onto and unwound from a lockable winding unit (30), and
wherein the actuatable drive device (44) comprises an electric motor (46), the electric motor (46) being configured to determine the position of the retaining device (20) between the open position and the closed position, such that adjusting the retaining device (20) from the open position into the closed position is further performed using the lockable winding unit (30) by a torque which is changed by the electric motor (46) according to the position of the retaining device (20), the lockable winding unit (30) being driven by the electric motor (46).

16. A method for operating a passenger receptacle (10) according to claim 1, comprising the following steps:
moving the retaining device (20) into the closed position;

in the event that the retaining device (20) moves or wants to move away from the closed position by a selectable degree, blocking a further movement of the retaining device (20) away from the closed position by means of the securing device (26);

adjusting the retaining device (20) from the open position into the closed position by means of the securing device (26) by actuating the drive device (44); and adjusting the retaining device (20) from the open position into the closed position by means of the winding unit (30) by the torque which is changed by the electric motor (46) according to the position of the retaining device (20).

17. The method according to claim 16, wherein the tensile force transfer means (28) is operated at reduced load as long as a further movement of the retaining device (20) away from the closed position by means of the tensile force transfer means (28) is not blocked.

18. An amusement ride (50) comprising a passenger receptacle (10) according to claim 1, which can be operated with a method characterized by the following steps:

moving the retaining device (20) into the closed position; and in the event that the retaining device (20) moves or wants to move away from the closed position by a selectable degree, blocking a further movement of the retaining device (20) away from the closed position by means of the securing device (26).

\* \* \* \* \*